Figure 1:
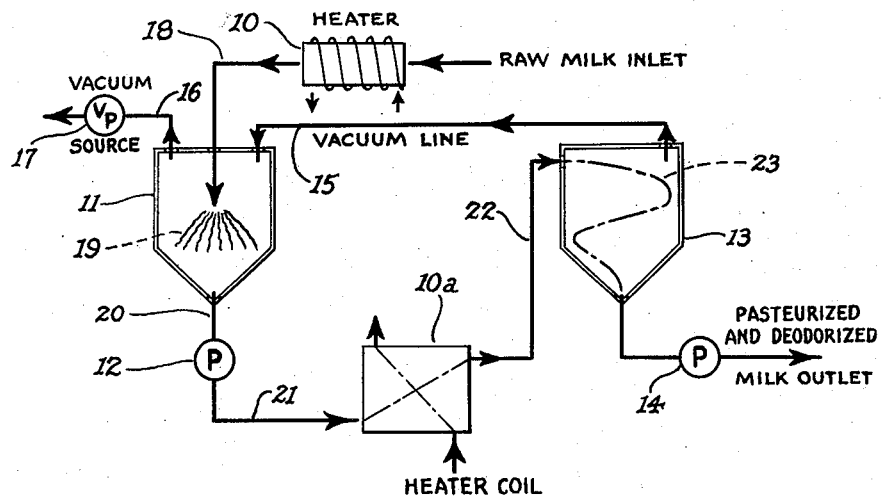

Sept. 2, 1958  R. C. SODERLUND  2,849,931
PASTEURIZING AND DEODORIZING OF LIQUIDS
Filed Feb. 20, 1956

INVENTOR.
Robert Charles Soderlund
BY
Davis, Hoxie and Faithfull
ATTORNEYS 2,849,931
Patented Sept. 2, 1958

United States Patent Office

2,849,931
PASTEURIZING AND DEODORIZING OF LIQUIDS

Robert Charles Soderlund, Poughkeepsie, N. Y., assignor to The De Laval Separator Company, Poughkeepsie, N. Y., a corporation of New Jersey Application February 20, 1956, Serial No. 566,397

2 Claims. (Cl. 99—212)

This invention relates to heat treating and deodorizing of liquids and has particular reference to an improved method and system for this purpose.

For illustrative purposes, the invention will be described in connection with the deodorization and pasteurization of whole milk, although it is to be understood that the invention is not limited to this use.

In the conventional deodorizing of whole milk or milk products, the milk is first pasteurized and then passed into a chamber under partial vacuum, where the heat retained in the milk from the pasteurization causes at least the more volatile constituents of the milk to flash or boil. As a result, some of the water content of the milk (the exact amount depending upon the temperature-vacuum-time relation) is withdrawn from the milk and passed to waste together with the volatile odor bodies, such as oils of wild onion or garlic, which are intended to be removed from the milk by the flashing treatment. Experience has shown that a loss of water from the milk in the order of 1% by volume is usually incurred by the practice of this process. A conventional method of compensating for this water loss is to inject live steam into the deodorized milk in a controlled amount sufficient to make up the water lost by flashing of the milk in the vacuum chamber. This compensation, however, requires extensive and accurate controls; and even then it often results in a dilution of the milk if too much steam is injected, or only a partial make-up of the loss in total volume of the milk if too little steam is injected.

The present invention has for its principal object the provision of a method and system by which the above-noted difficulties are overcome.

According to the invention, the milk is passed through two interconnected partially evacuated chambers and an intermediate heater. Within the first chamber the temperature-vacuum relationship is insufficient to flash or boil the milk but is sufficient to extract air and any other easily removable gases from the milk. The milk then passes by way of the heater to the second chamber wherein the temperature-vacuum relationship is sufficient to flash or boil the milk. The resulting vapors are withdrawn from the second chamber through a closed path leading to the upper part of the first chamber, where the vapors are partially condensed. The remaining uncondensed vapors, consisting mainly of volatilized odor bodies, are withdrawn from the first chamber (together with the easily removable gases extracted from the milk in the first chamber) through a suction line leading to a vacuum source for maintaining the partial vacuums in the two chambers.

Due to this manner of interconnecting the chambers, the milk from the first chamber is heated so that it is at a subsantially higher temperature when it enters the second chamber, which is connected to the vacuum source through the first chamber and therefore is at a lower vacuum (higher sub-atmospheric pressure) than the first chamber; and the first chamber acts as a condenser whereby the water laden gases or vapors from the flashing of the milk in the second chamber are partially condensed and added to the milk in the first chamber, thus automatically providing a water make-up to maintain the volume of the loss at a minimum. With the chambers interconnected according to the invention, the product loss may consistently be held to 0.09% by volume.

A further feature of the invention is that a standard plate heat exchanger having a heating section and a regenerative section may be used in the system without change in its internal arrangement or special exterior piping connections. Thus, with the elimination of a special condenser or a condensing section as part of the plate heat exchanger, a substantial economy in operation and in outlay for equipment may be had.

Figure 2:
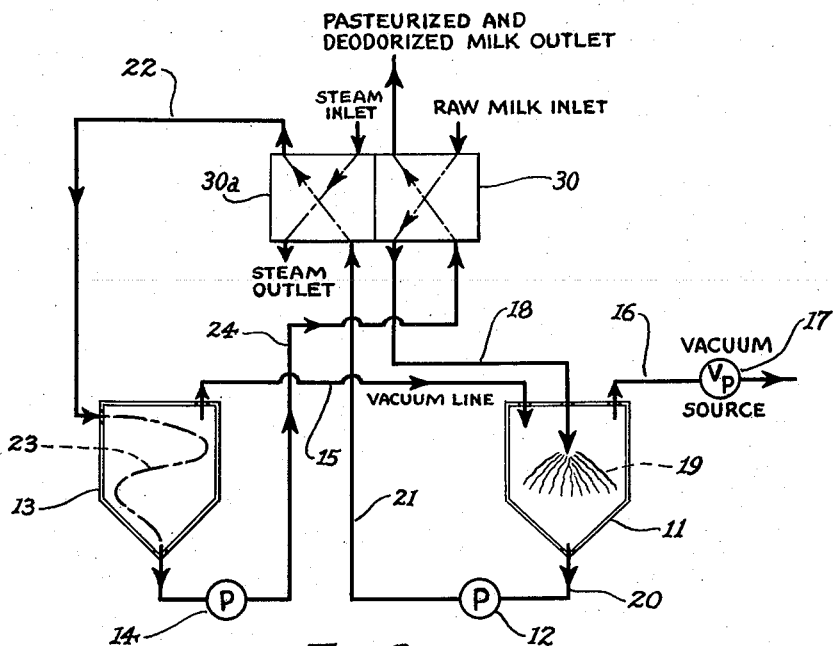

For a better understanding of the invention, reference may be had to the following description in conjunction with the accompanying drawing, in which Fig. 1 is a schematic view of one form of the new system, and Fig. 2 is a similar view of a modified form of the system wherein the heating units are the regenerative and pasteurizing sections of a pasteurizer of the plate heat exchanger type.

The system shown in Figure 1 comprises a heater 10, means such as a tank forming a de-gasifying chamber or zone 11, a circulation pump 12, a heater or pasteurizer 10a, a second tank or other means forming a vaporizing chamber or zone 13, and a second circulation pump 14. The tanks 11 and 13 are interconnected by a pipe line 15 forming a closed path between the upper parts of these tanks, and the first tank 11 is connected at its upper part by a suction line 16 to a source of sub-atmospheric pressure, such as a vacuum pump 17. The tanks are also interconnected through a pipe 20 leading from the lower part of tank 11, pump 12, pipe 21, heater 10a, and feed line 22 leading to the upper part of tank 13.

The raw milk to be deodorized and pasteurized is passed through heater 10 to the first tank 11 by way of a feed line 18 and is preferably sprayed into the upper part of the interior of tank 11, as indicated at 19. The tank 11 serves as a de-gasifying chamber. That is, the temperature of the milk entering chamber 11 and the partial vacuum therein, while insufficient to cause flashing of the milk in this chamber, are sufficient to extract air and other easily removable gases from the milk. The gases thus removed from the milk are withdrawn from the chamber 11 via vacuum line 16.

The de-gassed milk collects at the bottom of tank 11 and flows to the pasteurizer 10a via pipe 20, pump 12 and pipe 21. Within the pasteurizer unit, the milk temperature is raised to the usual level and held for the usual time in accordance with standard pasteurizing practices. On leaving the pasteurizer, the heated milk passes through feed line 22 to the upper part of the second tank 13. It is preferred that the milk enter this tank tangentially so that it flows about the walls thereof in a thin layer with a downwardly spiralling movement as indicated at 23. The milk temperature and the partial vacuum within tank 13 are sufficient to flash or boil the milk flowing therethrough. Accordingly, the chamber within the tank 13 may be called a vaporizing chamber.

As the milk flashes in the vaporizing chamber 13, the objectionable odor bodies in the milk, such as oils of wild onion and garlic, are boiled off along with some of the water content of the milk. The resulting vapors are withdrawn from the chamber 13 at the upper part thereof via pipe line 15 to the upper part of the de-gasifying chamber 11. It will be understood that there is a pressure drop through pipe line 15 from chamber 13 to chamber 11. In other words, the suction line 16 maintains a higher vacuum in chamber 11 than in chamber 13. Since the temperature within the chamber 11 is somewhat lower than that within the chamber 13, the vapors flashed off in chamber 13 will partially condense in chamber 11. That is, the temperature and pressure in chamber 11 are such that the milk water from pipe line 15 will readily condense and mix with the incoming milk spray 19 from feed line 18, while the vaporized volatile oils (the source of the objectionable odors) will remain in a vaporized state and be removed from chamber 11 at the upper part thereof via the suction line 16 and vacuum pump 17.

In the arrangement according to Figure 2, corresponding parts are indicated by the same numerals as in Figure 1. The separate heater 10 and separate pasteurizer 10a of Figure 1 are shown in Figure 2 in the form of a two-section plate-type pasteurizer regularly used in milk plants. In this arrangement, the functions of the raw milk heater 10 (Fig. 1) are performed in the regenerative section 30 of the pasteurizer, and the milk pasteurization is performed in the pasteurizer section 30a. The regenerative section 30 of the plate-type pasteurizer is fed, via pipe 24 and pump 14, with the hot milk collected at the bottom of the vaporizing chamber 13, in countercurrent relation to the raw milk inlet stream. Thus, the hot milk from vaporizing chamber 13 is used to heat the raw milk passing via feed line 18 to the de-gasifying chamber 11.

The following is an example of the practice of the invention with the system illustrated in Fig. 2.

In the pasteurizing section 30a, the milk is heated to 162° F. for the usual short time. The heated milk from section 30a enters the vaporizing chamber 13, which is under 22 inches of vacuum, and leaves this chamber through line 24 at a temperature of 152° F. The milk at about this temperature enters the regenerative section 30 and there heats the raw incoming milk to a temperature of 125° to 135° F. This initially heated raw milk is sprayed into the de-gasifying chamber 11, which is under 23 to 23½ inches of vacuum. The milk leaves chamber 11 via pump 12 at a temperature which is about 5° to 6° F. higher than the temperature at which the milk entered chamber 11, the milk from this chamber being then heated in the pasteurizing section as previously described.

I have found that good results can be obtained according to the invention by heating the milk in the heater 10a or section 30a to a temperature as high as 200° F. or as low as 80° F., with corresponding vacuums of about 6 inches and 29 inches, respectively, in the chambers 11 and 13.

I claim:

1. A method of heat-treating and deodorizing a liquid, which comprises feeding the liquid into the upper part of a de-gasifying zone while maintaining said zone under a partial vacuum, said vacuum being insufficient to flash the liquid at the temperature thereof in said zone but sufficient to extract easily removable gases from the liquid in said zone, feeding liquid from the lower part of said zone to a heating zone and there heating it to a substantially higher temperature, feeding heated liquid from said heating zone to the upper part of a vaporizing zone while maintaining said last zone under a partial vacuum lower than the partial vacuum in the de-gasifying zone, the temperature of the liquid entering said vaporizing zone being sufficient to flash part of the liquid under the partial vacuum in said last zone, passing vapors from said last zone through a closed path to the upper part of the de-gasifying zone and there partially condensing said vapors, withdrawing remaining uncondensed vapors from the upper part of the de-gasifying zone together with said easily removable gases, and withdrawing liquid from the lower part of the vaporizing zone.

2. A method according to claim 1, in which said substantially higher temperature is about 80° to 200° F., said liquid being milk, and said partial vacuum being sufficient to flash part of the milk at said higher temperature.

References Cited in the file of this patent

UNITED STATES PATENTS

| 1,693,034 | Jensen | Nov. 27, 1928 |
| 2,078,841 | Fauth | Apr. 27, 1937 |
| 2,516,099 | Board et al. | July 25, 1950 |

FOREIGN PATENTS

| 22,636 of 1935 | Australia | June 15, 1935 |
| 166,786 | Australia | Feb. 6, 1956 |